Figure 1:
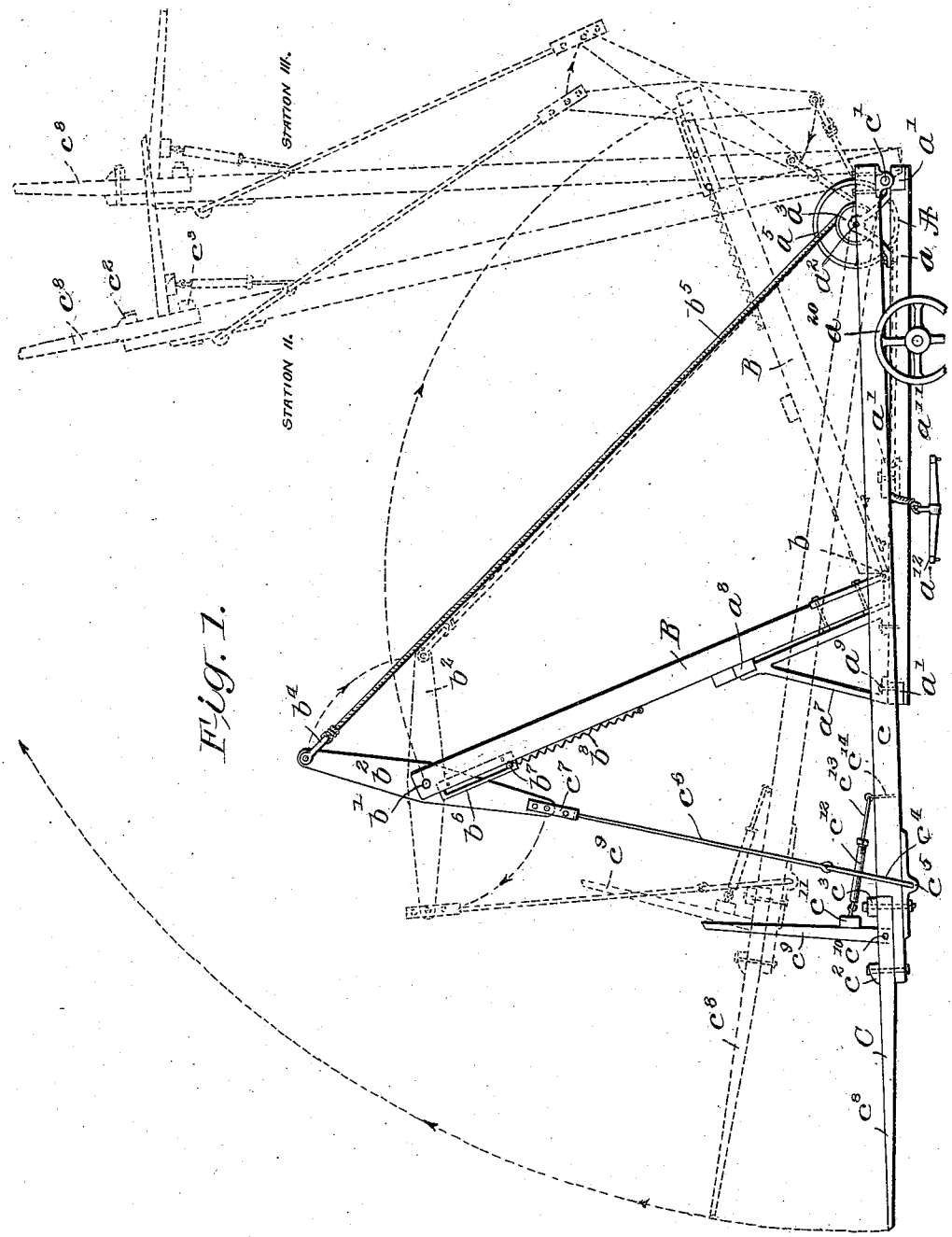

No. 876,778. PATENTED JAN. 14, 1908.
C. C. DENENNY.
HAY STACKER.
APPLICATION FILED AUG. 22, 1907.
2 SHEETS—SHEET 1.

WITNESSES
INVENTOR
CHRISTOPHER C. DENENNY.
BY
ATTORNEYS

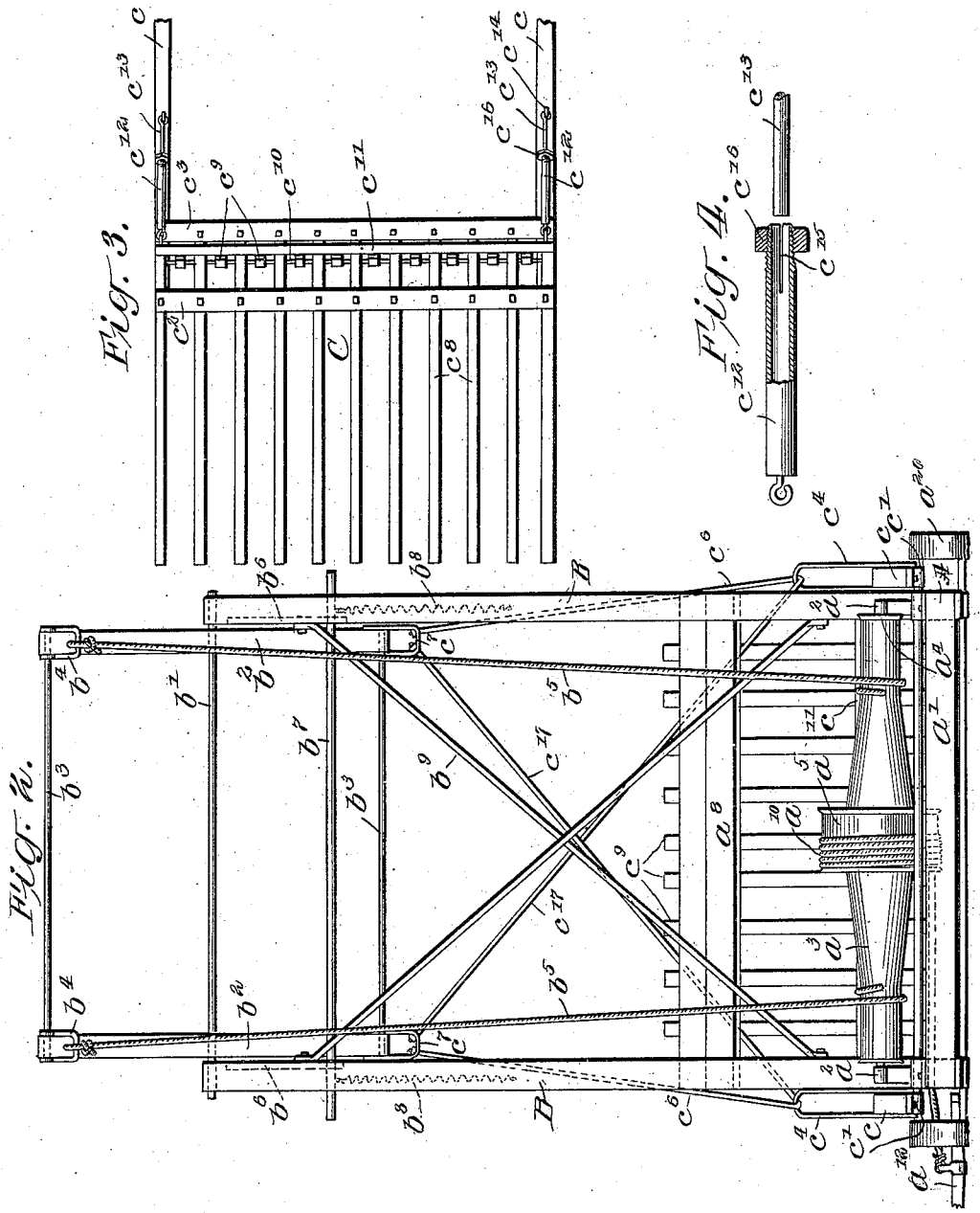

UNITED STATES PATENT OFFICE.

CHRISTOPHER CHARLES DENENNY, OF FELTON, MINNESOTA.

HAY-STACKER.

No. 876,778. Specification of Letters Patent. Patented Jan. 14, 1908.

Application filed August 22, 1907. Serial No. 389,664.

*To all whom it may concern:*

Be it known that I, CHRISTOPHER CHARLES DENENNY, a citizen of the United States, and resident of Felton, in the county of Clay and State of Minnesota, have invented an Improvement in Hay-Stackers, of which the following is a specification.

My invention is an improvement in hay stackers, and consists in certain novel constructions and combinations of parts hereinafter described and claimed.

Referring to the drawings forming a part hereof, Figure 1 is a side view of the improved stacker. Fig. 2 is an end view. Fig. 3 is a plan view of a portion of the fork; and Fig. 4 is a detail view partly in section of the telescoping shaft.

The present embodiment of my invention comprises a base A, composed of the side bars $a$, and the cross bars $a'$, secured together in any suitable manner, the frame being provided at one end with brackets $a^2$ secured to the respective side bars, and provided with bearings in which are journaled the trunnions of a roller $a^3$ provided at each end with flanges $a^4$, and at its center with a flanged drum $a^5$, for a purpose to be hereafter described. A rope $a^{10}$ is wound upon the drum $a^5$, one of the ends of the rope being secured to the drum, and the other end passes forward through a pulley $a^{11}$ secured to a cross bar $a'$, and a swingletree $a^{12}$ is attached to the free end of the rope.

At the opposite end of the base from the roller, brackets $a^7$ are arranged one upon each side bar, the free ends of the brackets being connected by a cross bar $a^8$ for a purpose to be presently described, and the brackets are secured to the cross bars by the screws $a^9$.

A standard B is hinged to each of the side bars of the base as at $b$, and the free ends of the standards are connected together by a shaft $b'$ upon which shaft are pivotally mounted by their centers, bars $b^2$, the respective ends of the bars being connected together by rods $b^3$. The corresponding ends of each bar are provided with loops $b^4$, to which are attached ropes $b^5$ secured to the roller $a^3$, and winding thereon when the roller is rotated. The standards B normally rest upon the cross bar $a^8$ before described, and when traction is exerted upon the ropes $b^5$, it is evident that the end of the bars to which the ropes are attached will be moved until they are approximately in a direct line between the shaft $b'$ and the roller, after which traction will be exerted upon the standards B to draw them toward the roller.

A hay fork C is connected with the base, the fork comprising the side bars $c$ hinged to the rear end of the base as at $c'$, and connected at their opposite ends by cross bars $c^2$, $c^3$. Each of the side bars adjacent to the rearmost cross bar is provided with a loop $c^4$ journaled in the bearing $c^5$ secured to the side bar, the free end of the loop being connected by a link $c^6$ with a fitting $c^7$ on the opposite end of the bar $b^2$ from the end connected with the rope $b^5$. A plurality of horizontal fingers $c^8$ are connected with the cross bars $c^2$, $c^3$, and a plurality of vertical fingers $c^9$ are arranged between the cross bars, the vertical fingers being pivoted upon a rod $c^{10}$ traversing the horizontal fingers, and the vertical fingers are connected together by a cross bar $c^{11}$. To each end of the cross bar $c^{11}$ is pivotally connected one of the sections $c^{12}$, of a telescoping shaft, the other section $c^{13}$ being pivoted to an eye bolt $c^{14}$ connected with the respective side bar. The free end of the section $c^{12}$ is split as at $c^{15}$, the outer surface thereof being cone shaped, and a nut $c^{16}$ is threaded on to the split portion, whereby to compress said split portion upon the inner section to retain the sections in their adjusted position. By the above described mechanism, the inclination of the vertical fingers $c^9$ may be varied with respect to the horizontal fingers, merely by loosening the nut and extending or contracting the telescoping shaft.

A slotted bracket $b^6$ is secured to each of the standards B adjacent to the top thereof, and a shaft $b^7$ extends between the brackets, the ends of the rod being received in the slots of the brackets, and each end of the rod is connected by a spring $b^8$ with the respective standard.

In the operation of the stacker, when a sufficient amount of hay is placed on the horizontal fingers, traction is exerted on the rope $a^{10}$ to cause the drum to rotate, whereby to wind up the ropes $b^5$ on the roller. As the ropes are wound up, the rear end of the bars $b^2$ are depressed as shown by dotted lines in Fig. 1, and the fork with its load is lifted off the ground. It will be evident that considerable leverage is brought to bear on the loaded fork during its initial movement, and that the fork will be elevated to a considerable extent before a direct pull is brought on the standards to swing them rearwardly. After the rear end of the bar $b^2$ is depressed sufficiently to bring the said bar into substantial alinement with the rope $b^5$, the standards will begin to swing rearwardly, thus swinging the hay fork into the position shown by dotted lines, and designated as Station II. At this point, the side bars of the hay stacker engage with the shaft $b^7$, and move it against the resistance of the springs $b^8$ toward the upper end of the loop, as shown by dotted lines in the said position designated as II. The inertia of the fork and its load tends to move it into the position designated as III in the said figure, and the reaction of the spring will quickly jerk the fork back into the position designated as II, thus discharging the load with a jerk sufficient to clear the normally vertical fingers which, however, are now horizontal. When the fork is moved back into the position II, its inertia tends to move it back into its original position resting on the ground, thus reversing the motion of the roller and winding up the draft rope on the drum.

The standards B are connected together by suitable cross braces $b^9$, and each of the links $c^6$ is connected by a cross brace $c^{17}$ with the opposite bar $b^2$, as clearly shown in Fig. 2. The stacker is provided with wheels $a^{20}$ near its rear end, for convenience in moving the same from place to place.

I claim:

1. A hay stacker comprising a base, a roller journaled transversely thereof and provided at its center with a drum of greater diameter than the roller, a draft rope secured to the drum and winding thereon, a fork provided with side bars hinged to the base adjacent to the ends of the roller, loops connected with the side bars near the free ends thereof, standards hinged to the sides of the base at the opposite end from the roller, bars pivoted by their centers to the free ends of the standards, a link connecting one end of each bar with the adjacent loop, ropes connected with the other ends of the bars, and winding on the roller, a slotted bracket on the upper end of each of the standards, a shaft having its ends received in the slots of the brackets and projecting therebeyond to engage the side bars of the fork when said fork is lifted to a vertical position, a spring connecting each end of the shaft with the respective standard whereby to normally retain said shaft at the lower ends of the slots, and a stop on the base for supporting the standards when the fork is in its lowered position.

2. A hay stacker comprising a base, a roller journaled transversely thereof and provided at its center with a drum of greater diameter than the roller, a draft rope secured to the drum and winding thereon, a fork provided with side bars hinged to the base adjacent to the ends of the roller, standards hinged to the sides of the base at the opposite end from the roller, bars pivoted by their centers to the free ends of the standards, a link connecting one end of each bar with the adjacent side bar of the fork, ropes connected with the other ends of the bars and winding on the roller, a slotted bracket on the upper end of each of the standards, a shaft having its ends received in the slots of the brackets, and projecting therebeyond to engage the side bars of the fork when said fork is lifted to a vertical position, a spring connecting each end of the shaft with the respective standard, whereby to normally retain said shaft at the lower ends of the slots, and a stop on the base for supporting the standards when the fork is in its lowered position.

3. A hay stacker comprising a fork composed of a pair of connected side bars, one end of the pair being fixed, and the other provided with means for supporting a load of hay, said means comprising a pair of cross bars connecting the free ends of the fork, a plurality of horizontal fingers connected with the cross bars, and a plurality of vertical fingers pivoted to the horizontal fingers, and means for varying the angle of inclination of the vertical fingers, said means comprising a bar connecting said fingers, telescoping shafts connecting the ends of the bar with the side bars of the fork, and means for fixing said shafts in their adjusted position.

4. A hay stacker comprising a base, standards hinged to the sides of the base, a slotted bracket on the upper end of each of the standards, a shaft having its ends received in the slots of the bracket and projecting therebeyond, a spring connecting each end of the shaft with the respective standard, a fork having one end hinged to the base, and adapted to engage the projecting ends of the shaft for the purpose set forth.

5. A hay stacker comprising a fork provided at one end with means for supporting a load of hay, said means comprising a plurality of horizontal fingers, and a plurality of vertical fingers pivoted to the horizontal fingers, and means for varying the angle of inclination of the vertical fingers, said means comprising a bar connecting said fingers, telescoping shafts connecting the ends of the bar with the fork, and means for fixing the shafts in their adjusted position.

6. A hay stacker comprising a fork provided at one end with means for supporting a load of hay, said means comprising a plurality of horizontal fingers, and a plurality of vertical fingers pivoted to the horizontal fingers, and means for varying the angle of inclination of the vertical fingers, said means comprising a bar connecting said fingers, a telescoping shaft connecting the end of the bar with the fork the outer section of the shaft being split and a nut threaded on to the split end for clamping said split end on the inner section.

CHRISTOPHER CHARLES DENENNY.

Witnesses:
E. J. MURPHY,
ANNIE L. MURPHY.